United States Patent
Han et al.

(10) Patent No.: US 9,051,207 B2
(45) Date of Patent: Jun. 9, 2015

(54) BORON AND FLUORINE-FREE GLASS FIBER COMPOSITES

(75) Inventors: Lixiong Han, Chongqing (CN); Xun Du, Chongqing (CN); Yuan Yao, Chongqing (CN); Dequan Chen, Chongqing (CN)

(73) Assignee: CHONGQING POLYCOMP INTERNATIONAL CORPORATION, Chongqing (CN)

( * ) Notice: Subject to any disclaimer, the term of this patent is extended or adjusted under 35 U.S.C. 154(b) by 0 days.

(21) Appl. No.: 13/574,694

(22) PCT Filed: Jul. 6, 2011

(86) PCT No.: PCT/CN2011/001115
§ 371 (c)(1),
(2), (4) Date: Jul. 23, 2012

(87) PCT Pub. No.: WO2012/109777
PCT Pub. Date: Aug. 23, 2012

(65) Prior Publication Data
US 2014/0113799 A1      Apr. 24, 2014

(30) Foreign Application Priority Data
Feb. 14, 2011  (CN) .......................... 2011 1 0037472

(51) Int. Cl.
*C03C 13/00*  (2006.01)
*C03C 3/087*  (2006.01)

(52) U.S. Cl.
CPC ................. *C03C 13/00* (2013.01); *C03C 3/087* (2013.01)

(58) Field of Classification Search
CPC ...... C03C 3/087; C03C 13/00; C03C 13/001; C03C 13/06
USPC .......................................... 501/35, 36, 38, 70
See application file for complete search history.

(56) References Cited

U.S. PATENT DOCUMENTS

| | | | | |
|---|---|---|---|---|
| 3,876,481 A * | 4/1975 | Erickson et al. | ................. | 501/38 |
| 4,026,715 A * | 5/1977 | Erickson et al. | ................. | 501/38 |
| 5,523,265 A | 6/1996 | Rapp et al. | | |
| 5,789,329 A * | 8/1998 | Eastes et al. | ..................... | 501/36 |
| 5,932,500 A * | 8/1999 | Jensen et al. | ..................... | 501/36 |
| 5,935,886 A * | 8/1999 | Jensen et al. | ..................... | 501/36 |
| 6,346,494 B1 * | 2/2002 | Jensen et al. | ..................... | 501/36 |
| 6,458,436 B1 * | 10/2002 | Hansen et al. | ................ | 428/34.5 |
| 6,686,304 B1 * | 2/2004 | Wallenberger | .................. | 501/35 |
| 6,818,575 B2 * | 11/2004 | Wallenberger | .................. | 501/35 |
| 6,933,045 B2 * | 8/2005 | Tamura | ......................... | 428/364 |
| 6,962,886 B2 * | 11/2005 | Wallenberger | .................. | 501/35 |
| 7,144,836 B2 * | 12/2006 | Wallenberger | .................. | 501/70 |
| 7,153,799 B2 * | 12/2006 | Wallenberger | .................. | 501/70 |
| 2001/0011058 A1 * | 8/2001 | Tamura | ......................... | 501/86 |
| 2005/0085369 A1 * | 4/2005 | Jensen | ........................... | 501/35 |
| 2005/0113238 A1 * | 5/2005 | Wallenberger | .................. | 501/35 |
| 2007/0209401 A1 * | 9/2007 | Berthereau et al. | ............. | 65/475 |
| 2008/0124559 A1 * | 5/2008 | Fujiwara et al. | .............. | 428/432 |
| 2008/0125304 A1 * | 5/2008 | Berthereau et al. | ............. | 501/38 |
| 2008/0227615 A1 * | 9/2008 | McGinnis et al. | ............. | 501/38 |
| 2010/0029830 A1 * | 2/2010 | Fujiwara et al. | .............. | 524/492 |
| 2010/0093511 A1 * | 4/2010 | Berthereau et al. | ............. | 501/38 |
| 2010/0222198 A1 * | 9/2010 | Zhang et al. | .................... | 501/38 |

FOREIGN PATENT DOCUMENTS

| | | |
|---|---|---|
| CN | 1392870 A | 1/2003 |
| CN | 101597140 A | 12/2009 |
| CN | 102173594 A | 9/2011 |
| FR | 2910462 A1 * | 6/2008 |
| GB | 1391384 A * | 11/1975 |
| JP | 2000247677 A * | 9/2000 |
| WO | 02062712 A1 | 8/2002 |

OTHER PUBLICATIONS

State Intellectual Property Office of P. R. China (ISA/CN), "International Search Report", Apr. 19, 2012, China.

* cited by examiner

*Primary Examiner* — Anthony J Green
*Assistant Examiner* — Elizabeth A Bolden
(74) *Attorney, Agent, or Firm* — Tim Tingkang Xia, Esq.; Morris, Manning & Martin, LLP

(57) ABSTRACT

This invention discloses a kind of boron and fluorine-free fiberglass composite with its characteristic that it has the following compounds under particular mix ratio: $SiO_2$, $Al_2O_3$, $SiO_2+Al_2O_3$, CaO, MgO, $TiO_2$, ZnO, $Na_2O+K_2O$ and $Fe_2O_3$. The preferential process of this invention is: selection of mineral→grinding of mineral→compounding as per ratio→melting in furnace→outflow from platinum bushing→fiberizing→coating of infiltrating liquid→protofilament drying. Compared with the traditional E fiberglass, the composite of this invention has better mechanical performance (tensile strength increased by over 15% and elastic modulus increased by over 5%) and better corrosion resistance (resistance of acid and alkali increased by 20 times); its forming temperature (<1280° C.) and forming range (>80° C.) are proper with good fiberizing performance, which can be produced in large scale.

3 Claims, No Drawings

BORON AND FLUORINE-FREE GLASS FIBER COMPOSITES

CROSS REFERENCE TO RELATED APPLICATIONS

This application is the U.S. National Stage of International Application No. PCT/CN2011/001115, filed Jul. 6, 2011, which itself claims priority and the benefits of Chinese Application No. 201110037472.0, filed Feb. 14, 2011. Both of the applications are incorporated by reference herein in their entirety.

FIELD OF THE INVENTION

This invention relates to continuous glass fibers, more particularly, high-performance glass fibers having glass composites that are boron and fluorine free.

BACKGROUND TECHNOLOGY

Fiberglass is an important inorganic nonmetal reinforced material, and it will form glass fiber reinforced composites with excellent performance by compositing with various resins, which will be widely used in civil construction, communication and transportation, electronics, machinery, chemistry, etc. At present, there have been thousands of varieties and specifications of fiberglass with more than 50 thousand of applications. Among various fiber reinforced products, the glass fiber reinforced composites have accounted more than 85% of the total output.

E fiber was firstly produced by Owens Corning Company in America. At present, America and Europe are still the main consumption regions of fiberglass in the world. Though the fiberglass industry starts later in China, it develops rapidly. In 2004, the annual output of fiberglass in China had exceeded that in America, ranking the first place of the world; in 2010, the annual output of fiberglass in China had reached more than 50% of the total fiberglass output in the world with three large-scale manufacturing enterprises emerged: Jushi Group Co., Ltd., Chongqing Polycomp International Corporation and Taishan Fiberglass Co., Ltd., whose outputs and scales have ranked Top 6 among world fiberglass industry. Now, China has become the world largest fiberglass manufacture and output base, and also one of the most important research, development and innovation bases of fiberglass in the world.

I. Disclosure of Products

At present, the boracic medium-alkali glass (C glass) is used in small amount for producing acid-proof products of C fiberglass at aboard. Though the traditional E-glass (such as direct roving 362K/352B for LFT produced by Jushi Group Co., Ltd.; SMC/BMC roving 956/957 produced by OCV Company) dominate the market, it has many defects on performance, component, cost and process, such as insufficiency of tensile strength and elastic modulus, relatively bad chemical resistance, and easily-caused environmental pollution by some components of the glass. In order to overcome these defects, enterprises in various countries added some new glass components to conduct a number of research and development in recent years. However, although enterprises at home and aboard have developed many new fiberglass products, their development orientation and technical achievements are of no industrial application value in many cases.

Fluorine free glass was developed under environmental stress in recent year, and due to the replacement of fluoride by other fluxing agent, the cost of F free glass is raised. But many F free E-glass technologies do not have industrial application value, and most of relevant technologies are not put into production.

In the 1980s, Owens Corning developed a classical anti-corrosive glass fiber (E-CR glass fiber), which is the earliest B and F free glass fiber that can be put into practice. E-CR glass fiber is composed of $SiO_2$—$Al_2O_3$—CaO—MgO with 3~5% of $TiO_2$, whose liquidus temperature exceeds 1200° C. and forming temperature is up to 1340° C. Although E-CR glass fiber contains no B and F, excessive $TiO_2$ made it too dark, which confined its applications; and such high liquidus temperature and forming temperature are severe challenge for nozzle plates and refractory. It can be hardly used in practices for too difficult production and too high cost.

Owens Corning Company is an oldest production enterprise of E fiberglass. It had developed a kind of B free and alkali free fiberglass in late 1990s: Advantex, whose electric property and strength property are similar to E fiberglass and the chemical resistance approximate to ECR glass. For it does not contain boron, the volatilization of boron compounds during glass melting is avoid, so as to reduce the environmental pollution and the corrosion to fireproofing materials. However, the glass still contains fluorine, and the forming temperature, liquidus temperature and forming range $\Delta T$ required by component allocation for producing the glass need to change general equipment; the fiberglass adopts universal special device and its production cost is relatively high, which brings difficulties to large-scale industrial promotion.

II. Disclosure of Documents

Technically, fiberglass is a kind of fibrous material drawn after melting of various natural mineral materials into glassy state under high temperature in certain component ratio, which is, in essence, a kind of glass or a kind of fibrous glass, so it can be called as glass fiber or fiber glass. According to the component of glass, the fiberglass can be divided, in general, into alkali free fiberglass, medium-alkali fiberglass and high-alkali fiberglass, and the alkali free fiberglass is named as E fiberglass at aboard, whose content of alkalis oxide ($Na_2O$, $K_2O$ and $Li_2O$) is generally less than 1%.

At present, 90% of international fiberglass products belong to E-glass.

E-glass is generally called as E-glass in English. E-glass is also called as alkali free glass, a kind of borosilicate glass. It is now a most widely used glass component for fiberglass; for it has good electrical insulation and mechanical performance, it is widely used for producing electrical insulation fiberglass and producing special fiberglass for glass reinforced plastic in large amount (reference: Wang C Y, Chen M, Chen J H; *Glass Manufacturing Process*; Chemical Industry Press; published on Jul. 1, 2006; Page 182; Zhang Y M; *Glass Fiber and Mineral Wool*; Chemical Industry Press; revised on Nov. 1, 2010; Page 216).

Since its emergence at 1930s, E fiberglass has been continuously improved and has become a kind of important inorganic non-metal reinforced material. Now fiberglass is an independent industry system for reinforced polyester resin, epoxy resin, vinyl resin, phenolic resin, etc. which are widely used in architecture, transportation, military, and living. Among them, E glass is a product mostly used.

Because the fiberglass (hereinafter referred to as fiberglass) is a kind of glass in essence, it does not contain crystals; it is a network structure mainly constructed by Si and Al atoms with positive ion filled in interspaces. All traditional E-glasses contain B (boron), which also participates in network structure in glass. After being added into glass, various oxides will finally exist in atom form, which is not related to the compound added.

The conventional E glass fiber belongs to $SiO_2$—$Al_2O_3$—$B_2O_3$—CaO system, which is characterized by good insulation, heat resistance, anti corrosion, and mechanically high strength, moreover, it has lower fiberizing temperature and wide range of operating temperature. With good processing performance, it has been used up to present since its emergence at 1930s. The conventional E glass contains a certain amount of boron and fluorine, which have a good effect on reducing the glass melting temperature and the surface tension and viscosity of glass flow, thus minimizing the difficulty of glass fiber production. However, boron and fluorine have adverse effect on the glass fiber in its strength and anti corrosion. Furthermore, boron and fluorine are prone to volatile heavily, especially fluorine, over 50% of which is likely to volatile. This not only wastes raw materials, but also seriously pollutes the environment. For this purpose, both China and overseas countries have strict policies on the control of its emission, which require glass fiber producers to equip matching waste gas treatment plants, undoubtedly, increasing the production cost.

Therefore, the research and development of low B and F, or even B and F free glass fiber has always been a development trend of the international glass fiber industry. Although a number of researches and technical inventions have come out, there still exist some practical problems. That is because B and F in the conventional glass fiber play a role in melting assistance and the reduction of glass flow surface tension, which can better improve the forming of glass fiber. With remarkable decreased amount of B and F, or even without B and F, viscosity of glass flow will highly increase, and the operating temperature must be higher, which enhances the difficulty in the forming of glass fiber. Thus we must search another matter to act as B and F, although this is a rather hard way.

U.S. Pat. No. 5,789,329 is a B free glass fiber containing 59~62% of $SiO_2$, 20~24% of CaO, 12~15% of $Al_2O_3$, 1~4% of MgO, 0~0.5% of $F_2$, 0.1~2% of $Na_2O$, 0~0.9% of $TiO_2$, 0~0.5% of $Fe_2O_3$, 0~2% of $K_2O$, and 0~0.5% of $SO_3$. This glass fiber has no $B_2O_3$ but contains some $F_2$, whose liquidus temperature is over 1169° C. whilst ΔT is below 80° C. Although this glass fiber allows absence of B and F, its liquidus temperature shall be up to 1206° C. while ΔT is down to 38° C., which is rather difficult to be produced due to crystallization.

Application WO99/12,858 has designed a low B and F reinforced glass fiber, in which $SiO_2$ 58~62%, CaO>22%, $Al_2O$ 10~16%, MgO>1.5%, CaO+MgO<28%, $R_2O$<2%, $TiO_2$<1.5%, $Fe_2O_3$<0.5%, $F_2$<2%, $B_2O_3$<2%. The content of $B_2O_3$ has been largely reduced in this glass fiber, but $F_2$, $Li_2O$, or $B_2O_3$ still needs to be more than 0.5%, so it is not truly B and F free. Furthermore, this glass fiber contains a large amount of alkali metals, which decreases the corrosion resistance of products.

Application WO99/12,858 has designed another reinforced glass fiber, which contains 54.5~58% of $SiO_2$, 17~25% of CaO, 12~15.5% of $Al_2O_3$, 0~5% of MgO, $R_2O$<2%, $TiO_2$<1%, $Fe_2O_3$<0.5%, $F_2$<1%, and $B_2O_3$<3%. It requires $B_2O_3$ content to be more than 2% when $SiO_2$ content is higher than 57%. This invention made contribution to the reduction of boron and fluorine in glass fiber, but absence of boron and fluorine has not been fully realized yet. And its low content of $SiO_2$ is unfavorable to its strength, which will confine its applications.

U.S. Pat. No. 6,818,575 provides a low B and F glass fiber containing 52~62% of $SiO_2$, 16~25% of CaO, 8~16% of $Al_2O_3$, 1~5% of MgO, 0~1% of $F_2$, 0~2% of $Na_2O$, 0~2% of $TiO_2$, 0.06~0.8% of $Fe_2O_3$, 0~2% of $K_2O$, and 0~5% of $B_2O_3$. The forming temperature of this glass fiber is low and the forming range is good. To achieve these forming advantages, the formula in the inventor's claims has high contents of $Li_2O$ (0.6%~1.4%) and $TiO_2$ (0.5%~1.5%), and over 0.9% of alkali metals. High content of alkali metals will largely reduces the corrosion resistance of glass fiber, and the production cost will be higher due to expensive $Li_2O$ raw materials.

Application WO2005/093,227 has designed a low B and F E glass fiber, which contains 59~63% of $SiO_2$, 16~23% of CaO, 10~16% of $Al_2O_3$, 1~3.2% of MgO, 0~0.5% of $F_2$, 0~2% of $R_2O$, 0~1% of $TiO_2$, 0~0.5% of ZnO, 0~1% of MnO, 0~0.5% of $Li_2O$, and 0.1~1.8% of $B_2O_3$. This glass fiber contains a little $B_2O_3$ much lower than the conventional E glass fiber, and contains MnO, which darkens the glass fiber. The forming temperature of this glass fiber is rather high (over 1350° C.), so it is hard to produce.

Application WO2005/092,808 has designed a similar low B and F E glass fiber, which contains 58~63% of $SiO_2$, 16~23% of CaO, 10~16% of $Al_2O_3$, 0.5~3.5% of MgO, 0~0.5% of $F_2$, 0~2% of $R_2O$, 1~1.5% of $TiO_2$, 0~0.4% of ZnO, 0~1% of MnO, 0~0.4% of $Li_2O$, and 0~1.5% of $B_2O_3$. This glass fiber contains not only a little B and F, but also MnO and CoO, which will darkens the glass fiber and confines its applications. Furthermore, the forming temperature of this glass fiber is also high up to over 1350° C., so it is hard to produce.

China Patent No. 200710069773.5 has designed an alkali free glass fiber containing 58~62% of $SiO_2$, 20~24% of CaO, 12~14% of $Al_2O_3$, 2~4% of MgO, 0.0~60.6% of $F_2$, 0.73~2% of $R_2O$, 2% of $TiO_2$, and 0.5~50.6% of $Fe_2O_3$. This invention contains no boron, but its alkali metals are high, which decreases its strength and corrosion resistance, and 2% of $TiO_2$ content will have adverse effect on the color of the glass fiber.

China Patent No. 200810121473.1 involves a low B and F glass fiber containing 54~62% of $SiO_2$, 20~28% of CaO, 12~18% of $Al_2O_3$, 2~6% of MgO, 0~0.4% of $F_2$, 0~5% of $B_2O_3$, 0~0.8% of $R_2O$, 0.1~1% of $TiO_2$, and 0.1~0.5% of $Fe_2O_3$. Although this invention described in the claims that its formula contains no $B_2O_3$ and $F_2$, the forming temperature and liquidus temperature will be high without F and B, causing it difficult to produce.

China Patent No. 200910099335.2 involves a low B glass fiber containing 57~61% of $SiO_2$, 20~25% of CaO, 12~16% of $Al_2O_3$, 1~3.5% of MgO, 0~2% of SrO, 0~1% of $CeO_2$, 0~0.5% of $MnO_2$, 0~1% of $F_2$, 0~2.5% of $B_2O_3$, 0~0.8% of $R_2O$, 0.1~1.5% of $TiO_2$, and 0.1~0.6% of $Fe_2O_3$. This glass fiber remarkably reduces $B_2O_3$ content but retains $F_2$. To improve the performance of this glass fiber, expensive $CeO_2$, SrO and $MnO_2$ were added into the formula, which increases the production cost.

From the above we can see that, no matter for the purpose of environmental protection and for cost consideration, reducing $B_2O_3$ and $F_2$ contents is an objective that the glass fiber counterparts are endeavoring to achieve, however, the reduction of boron and fluorine in the production of glass fiber will cause increased forming temperature and liquidus and large fiberizing difficulty. For this purpose, most glass fiber inventions retain some $B_2O_3$ or $F_2$ more or less, and their proportions may be higher as they are easy to volatile; some other inventions added expensive composites or greatly increased the operating temperature, but practical production is too difficult to realize.

Aiming at solving this contradiction in an effective way, this invention completely disuses B and F materials in the glass fiber formula while ensures proper forming temperature and good fiberizing performance, thus mass production can be realized. In addition, with better tensile strength and corrosion resistance, this glass fiber will more widely used in many fields.

SUMMARY OF INVENTION

This invention provides a B and F free glass fiber, which better meets the requirements of environmental protection nowadays (zero emission of fluoride and boride pollutants); compared with the common E glass fiber, it has better mechanical performance (tensile strength increased by over 15% and elastic modulus increased by over 5%) and better corrosion resistance (increased by 20 times); the forming temperature (<1280° C.) and forming range (>80° C.) are proper; and has good fiberizing performance. Therefore, mass production can be realized.

In the content of this invention, the parameters or terms are defined as follows:

$T_{log\ \eta=3}$ represents for the temperature at $10^3$ Pa·s glass viscosity, which amounts to the temperature of glass flow when glass fiber is formed, also called fiber forming temperature.

$T_{liquid}$ represents for the liquidus temperature of glass, which amounts to the temperature when the glass crystallization rate is 0, also the upper limit of glass crystallization temperature.

ΔT equals to $T_{log\ \eta=3}$ minus $T_{liquid}$, which is the workable range of glass fiber formation. The larger ΔT value is, the wider the process window for the glass fiber formation is, the more unlikely crystallization will occur in the process of glass fiber formation, and the easier the production is.

For the above purposes, this invention takes the below technical scheme:

A glass fiber composite contains components in percentage by weight within the range as follows:

| | |
|---|---|
| $SiO_2$ | 56~61 |
| $Al_2O_3$ | 12~16 |
| $SiO_2 + Al_2O_3$ | 72~75 |
| CaO | 21~25 |
| MgO | 2~5 |
| CaO + MgO | 24~27 |
| $TiO_2$ | 0.1~1.5 |
| ZnO | 0.1~2 |
| $Na_2O + K_2O$ | greater than 0, ≤0.8 |
| $Fe_2O_3$ | greater than 0, ≤0.6 |

The sum of all components, including other trace impurities, equals to 100%. If the total content of all components is slightly larger or smaller than 100%, we think that, others are impurities or a little amount of unanalyzed components, or it is because of acceptable error by the analytical method.

In the above glass fiber, the more preferable components with more preferable weight percentage as follows:

| | |
|---|---|
| $SiO_2$ | 59~61 |
| $Al_2O_3$ | 12.5~14 |
| $SiO_2 + Al_2O_3$ | 73~75 |
| CaO | 21~22.5 |
| MgO | 2.5~3.5 |
| CaO + MgO | 24~26 |
| $TiO_2$ | 0.1~1.2 |
| ZnO | 0.1~1.5 |
| $Na_2O + K_2O$ | greater than 0, ≤0.7 |
| $Fe_2O_3$ | greater than 0, ≤0.5 |

The forming temperature is not beyond 1265° C. and the liquidus temperature is not beyond 1150° C., ΔT larger than 80° C. Compared with the best ZenTron E glass fiber in the market, the tensile strength of this glass fiber composites increased by 15%, the elastic modulus increased by 5%, corrosion resistance increased by 20 times, almost equivalent to E-CR glass fiber.

In the most preferable implementation plan, continuous fiber with these glass composites in percentages by weight can be prepared: 59.97% of $SiO_2$; 13.24% of $Al_2O_3$; 73.21% of $SiO_2+Al_2O_3$; 22.08% of CaO; 3.16% of MgO; 25.24% of CaO+MgO; 0.27% of $TiO_2$; 0.51% of $Na_2O+K_2O$; 0.29% of $Fe_2O_3$ and 0.48% of ZnO. For this glass fiber, the forming temperature is about 1245° C. and the liquidus temperature is about 1140° C., ΔT being 105° C. This glass fiber possesses these performances as well: tensile strength 2366 MPa, elastic modulus 84.8 GPa (in accordance with ASTM 2343). Corrosion resistance: 0.74% of weightlessness in 10% HCl solution; 0.97% of weightlessness in 10% H2SO4 solution; 4.34% of weightlessness in 0.1 mol/L NaOH solution (by the powder method, i.e. to heat in a 60° C. water bath and dip for 24 hours).

This invention contains ZnO—an intermediate oxide, which can reduce the thermal expansion, improve high-temperature viscosity, and improve the chemical stability and thermal stability. This invention chooses 0.1~2% of ZnO content, preferably 0.1~1.5%. ZnO of this proportion acts with other oxides to obtain larger ΔT. On one hand, it reduces the difficulty of glass fiber forming; on the other hand, it largely improves the mechanical and anti-corrosive performances.

This invention hardly contains $B_2O_3$ and $F_2$. "Hardly contains" means that this invention does not add any $B_2O_3$ or $F_2$ containing raw materials, except trace impurities in the raw materials. Therefore, this invention realized true B and F free glass fiber. The production will not emit boride and fluoride that will seriously pollute the atmosphere, which meets the requirements of green production that we are now advocating and reduce the pressure on waste gas treatment as well, thus saving the production cost.

Generally, this invention can be prepared as follows: weigh the raw materials in the proportion of the selected composites and mix them by the means of pneumatic homogenization. The raw materials are mostly natural minerals such as pyrophillite, kaoline, quartz, limestone, and dolomite. Melt the mixture in a furnace to stable glass flow, which flows out from the Platinum nozzle plate, and then is drawn and winded to glass fiber at a proper diameter by the drawing machine. By other operations, the glass fiber can be formed as continuous fibers, chopped strands, felts, cloth, etc.

The preferential process of this invention is: selection of mineral→grinding of mineral→compounding as per ratio→melting in furnace→outflow from platinum bushing→fiberizing→coating of infiltrating liquid→protofilament drying. The preferential production method of this invention is: through preparation of mixed batch, the raw materials are conveyed to glass melting unit kiln to be made into glass melt, which will outflows through platinum-rhodium alloy multi-row bore bushing and be shaped into fiber by forced cooling and high-speed drafting; then, coated with prepared infiltrating liquid, the fiber will be conveyed to protofilament drying workshop and become finished product after drying.

The main equipments and systems adopted by this invention include: cone-type mixer, flat mixer, spiral conveyer, bucket elevator, storage of compound, self-conveyor feed, furnace combustion system, piping system, forehearth premixing system, combustion pipe system, single-block drawing machine with large package, cake-winding drawing machine, single-head direct roving machine with large package and roving machine with large package. The above-said equipments and systems shall be assembled and designed as per the technical scheme of this invention; for example, the platinum-rhodium alloy multi-row bore bushing shall be the stamping bushing designed by the inventor. The above-said equipments and systems are not within the composite protection scope of this invention. Moreover, the composite of this invention is not limited to use the above-said stamping bushing or the assembly of the above-said equipments and systems.

BENEFICIAL EFFECTS OF THIS INVENTION

Compared with the conventional E-glass, this invention features better corrosion resistance and higher strength and elastic modulus. Without B and F components that pollute the environment, it is an environmentally friendly product widely used in fans, automobile silencers, CNG cylinders, HP GFRP pipelines, urban sewage piping, automobile parts and other glass composites. Specifically, the beneficial effects of this invention are:

(1) Environmentally friendly: the conventional E glass fiber contains a certain amount of B and F, which is prone to volatile in the melting process and seriously pollute the environment. Boride and fluoride are the major pollutants emitted to the atmosphere in the production process of glass fiber. This invention absolutely has no B and F-containing materials, so it reduces the emission of pollutants in the production process, which answers for the concept of green production that we are advocating.

(2) Lower production cost: on one hand, this invention saves expensive B and F raw materials, whose cost is reduced; on the other hand, the conventional glass fiber requires treatment of B and F containing waste gas before emission, but this invention contains no B and F, so the procedure of treatment can be omitted, thus the production cost being reduced.

(3) This invention has a forming temperature and liquidus temperature close to the common E glass fiber, but has a larger ΔT, which reduces the difficulty of glass fiber formation and improves the productivity.

(4) Good mechanical performance: with optimum formula, this invention has much better mechanical performance. Compared with the common E glass fiber, its tensile strength has increased by 15% and elastic modulus by 5%.

(5) Excellent corrosion resistance: the conventional E glass fiber has poor corrosion resistance, but this invention has no $B_2O_3$ that is possible to bring split phase, and has ZnO that can improve the corrosion resistance. With formula optimization, it is largely improved to resist acid, alkali, and water, reaching the level of E-CR glass fiber.

DETAILED DESCRIPTION OF THE PREFERRED EMBODIMENTS

The present disclosure will now be described in more detail with reference to exemplary embodiments thereof. The present disclosure is not to be limited in scope by the specific embodiments described herein.

In the experiment, BROOKFIELD high-temperature viscosity tester will be used for measuring the forming temperature of glass fiber, and Orton Model Liquidus Point Furnace will be used for measuring the liquidus temperature.

Exemplary Embodiment 1

A glass fiber composite contains (in percentages by weight) 59.97% of $SiO_2$; 13.24% of $Al_2O_3$; 73.21% of $SiO_2$+ $Al_2O_3$; 22.08% of CaO, 3.16% of MgO; 25.24% of CaO+MgO; 0.27% of $TiO_2$; 0.51% of $K_2O+Na_2O$; 0.29% of $Fe_2O_3$ and 0.48% of ZnO. For this glass fiber, the forming temperature is about 1245° C. and the liquidus temperature is about 1140° C., ΔT being 105° C.

Exemplary Embodiment 2

A glass fiber composite contains (in percentages by weight) 59.75% of $SiO_2$; 13.63% of $Al_2O_3$; 73.38% of $SiO_2$+ $Al_2O_3$; 22.10% of CaO; 2.78% of MgO; 24.88% of CaO+MgO; 0.31% of $TiO_2$, 0.48% of $K_2O+Na_2O$; 0.29% of $Fe_2O_3$ and 0.66% of ZnO. For this glass fiber, the forming temperature is about 1255° C. and the liquidus temperature is about 1128° C., ΔT being 127° C.

Exemplary Embodiment 3

A glass fiber composite contains (in percentages by weight) 60.11% of $SiO_2$; 13.16% of $Al_2O_3$; 73.27% of $SiO_2$+ $Al_2O_3$; 21.67% of CaO; 2.93% of MgO; 24.60% of CaO+MgO; 0.41% of $TiO_2$; 0.47% of $K_2O+Na_2O$; 0.28% of $Fe_2O_3$ and 0.97% of ZnO. For this glass fiber, the forming temperature is about 1255° C. and the liquidus temperature is about 1134° C., ΔT being 121° C.

Exemplary Embodiment 4

A glass fiber composite contains (in percentages by weight) 60.19% of $SiO_2$; 13.16% of $Al_2O_3$; 73.35% of $SiO_2$+ $Al_2O_3$; 21.61% of CaO; 2.85% of MgO; 24.46% of CaO+MgO; 1.02% of $TiO_2$; 0.52% of $K_2O+Na_2O$; 0.28% of $Fe_2O_3$ and 0.37% of ZnO. For this glass fiber, the forming temperature is about 1256° C. and the liquidus temperature is about 1144° C., ΔT being 112° C.

Exemplary Embodiment 5

A glass fiber composite contains (in percentages by weight) 60.02% of $SiO_2$; 13.10% of $Al_2O_3$; 73.12% of $SiO_2$+ $Al_2O_3$; 21.27% of CaO; 2.92% of MgO; 24.19% of CaO+MgO; 0.64% of $TiO_2$, 0.50% of $K_2O+Na_2O$; 0.28% of $Fe_2O_3$ and 1.27% of ZnO. For this glass fiber, the forming temperature is about 1253° C. and the liquidus temperature is about 1146° C., ΔT being 107° C.

The invention claimed is:

1. A boron and fluorine-free glass fiber components, consisting of in weight percentage:

| | |
|---|---|
| $SiO_2$ | 60.11; |
| $Al_2O_3$ | 13.16; |
| $SiO_2 + Al_2O_3$ | 73.27; |
| CaO | 21.67; |
| MgO | 2.93; |
| CaO + MgO | 24.60; |
| $TiO_2$ | 0.41; |
| $Na_2O + K_2O$ | 0.47; |
| $Fe_2O_3$ | 0.28; and |
| ZnO | 0.97, | wherein a forming temperature of the boron and fluorine-free glass fiber components is about 1255° C.

2. A boron and fluorine-free glass fiber components, consisting of in weight percentage:

| | |
|---|---|
| $SiO_2$ | 60.19; |
| $Al_2O_3$ | 13.16; |
| $SiO_2 + Al_2O_3$ | 73.35; |
| CaO | 21.61; |
| MgO | 2.85; |
| CaO + MgO | 24.46; |
| $TiO_2$ | 1.02; |
| $Na_2O + K_2O$ | 0.52; |
| $Fe_2O_3$ | 0.28; and |
| ZnO | 0.37, | wherein a forming temperature of the boron and fluorine-free glass fiber components is about 1256° C.

3. A boron and fluorine-free glass fiber components, consisting of in weight percentage:

| | |
|---|---|
| $SiO_2$ | 60.02; |
| $Al_2O_3$ | 13.10; |
| $SiO_2 + Al_2O_3$ | 73.12; |
| CaO | 21.27; |
| MgO | 2.92; |
| CaO + MgO | 24.19; |
| $TiO_2$ | 0.64; |
| $Na_2O + K_2O$ | 0.50; |
| $Fe_2O_3$ | 0.28; |
| ZnO | 1.27, | wherein a forming temperature of the boron and fluorine-free glass fiber components is about 1253° C.

* * * * *